United States Patent
Krasner

(10) Patent No.: US 8,371,244 B2
(45) Date of Patent: Feb. 12, 2013

(54) PET WATER BOTTLE

(76) Inventor: Mark Krasner, Marietta, GA (US)

( * ) Notice: Subject to any disclaimer, the term of this patent is extended or adjusted under 35 U.S.C. 154(b) by 139 days.

(21) Appl. No.: 12/814,947

(22) Filed: Jun. 14, 2010

(65) Prior Publication Data

US 2010/0313817 A1    Dec. 16, 2010

Related U.S. Application Data

(60) Provisional application No. 61/261,947, filed on Nov. 17, 2009, provisional application No. 61/187,030, filed on Jun. 15, 2009.

(51) Int. Cl.
*A01K 7/06* (2006.01)
*B65D 55/16* (2006.01)

(52) U.S. Cl. ........ 119/72.5; 215/306

(58) Field of Classification Search ........ 119/72.5, 119/72, 75; 215/11.4, 306; 220/703, 592.17; 222/545
See application file for complete search history.

(56) References Cited

U.S. PATENT DOCUMENTS

| | | | | |
|---|---|---|---|---|
| 715,399 A * | 12/1902 | Low | ........ | 215/306 |
| 4,817,450 A * | 4/1989 | Jachim | ........ | 73/866.5 |
| 5,553,957 A * | 9/1996 | Dornbusch et al. | ........ | 401/209 |
| 5,653,353 A * | 8/1997 | Otto et al. | ........ | 215/306 |
| 5,909,820 A * | 6/1999 | Yeh | ........ | 220/711 |
| 6,095,708 A * | 8/2000 | Butaud | ........ | 401/209 |
| 6,105,803 A * | 8/2000 | Standish | ........ | 220/8 |
| 6,237,800 B1 * | 5/2001 | Barrett | ........ | 220/505 |
| 6,293,226 B1 * | 9/2001 | Hwang | ........ | 119/72 |
| 6,349,844 B1 * | 2/2002 | Betras | ........ | 220/709 |
| 6,718,912 B2 * | 4/2004 | Pappas | ........ | 119/72.5 |
| D489,627 S * | 5/2004 | Klitsner et al. | ........ | D9/502 |
| 6,766,917 B1 * | 7/2004 | Blewitt, III | ........ | 215/252 |
| 7,117,818 B2 * | 10/2006 | Pappas et al. | ........ | 119/72.5 |
| D577,584 S * | 9/2008 | Porter et al. | ........ | D9/447 |
| D594,088 S * | 6/2009 | Pritchard | ........ | D23/207 |
| 7,624,701 B2 * | 12/2009 | Ver Hage | ........ | 119/72 |
| D614,440 S * | 4/2010 | Cresswell et al. | ........ | D7/392.1 |
| D623,460 S * | 9/2010 | Krasner | ........ | D7/300.1 |
| 7,823,539 B2 * | 11/2010 | Keller et al. | ........ | 119/74 |
| D648,177 S * | 11/2011 | Eyal | ........ | D7/510 |
| 8,047,387 B2 * | 11/2011 | Chalekian et al. | ........ | 215/305 |
| 8,051,997 B2 * | 11/2011 | Buckley | ........ | 215/230 |
| D654,752 S * | 2/2012 | Krasner | ........ | D7/300.1 |
| 8,245,870 B2 * | 8/2012 | McKinney et al. | ........ | 220/375 |

* cited by examiner

*Primary Examiner* — Yvonne Abbott
(74) *Attorney, Agent, or Firm* — Gardner Groff Greenwald & Villanueva, PC

(57) ABSTRACT

A water bottle for pets comprises a stainless steel canister, a liquid dispenser, a removable screw cap. The canister is used for containing water and has a closed end and an open end. Threads are positioned near the open end of the canister. The removable dispenser has threads for engaging the threads near the open end of the canister and a pet-operable drink valve. The removable screw cap selectively covers and uncovers the pet-operable drink valve.

8 Claims, 4 Drawing Sheets

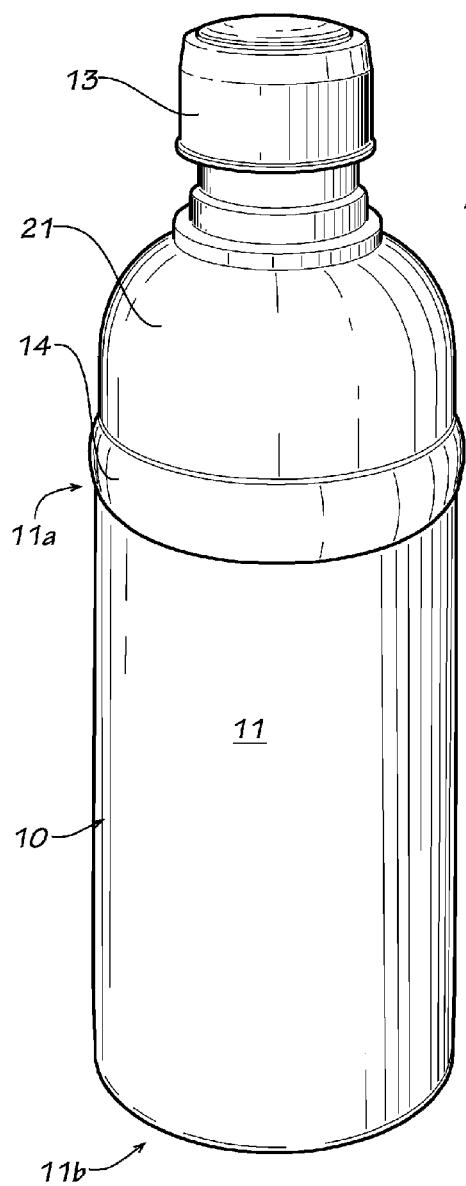
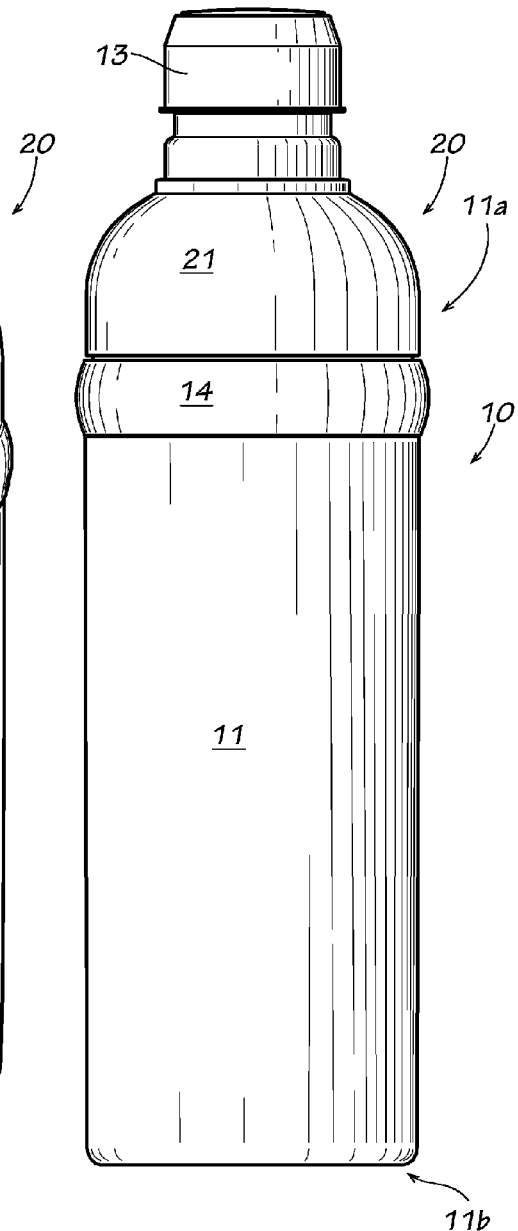
FIG. 1  FIG. 2

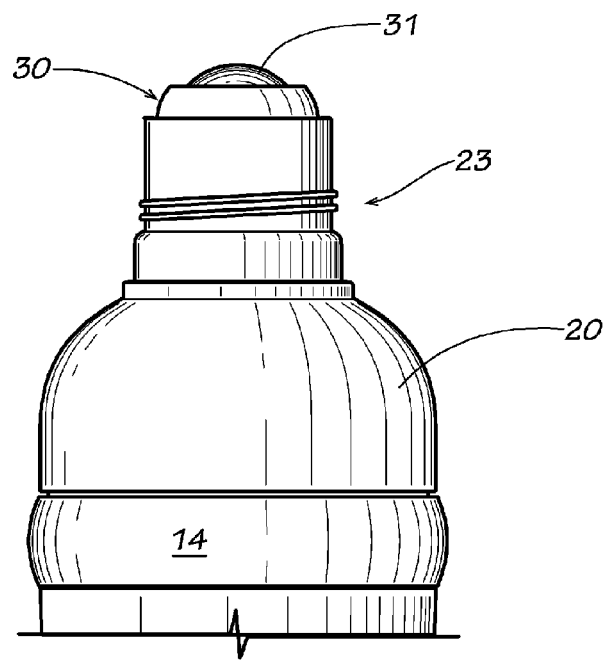
FIG. 5
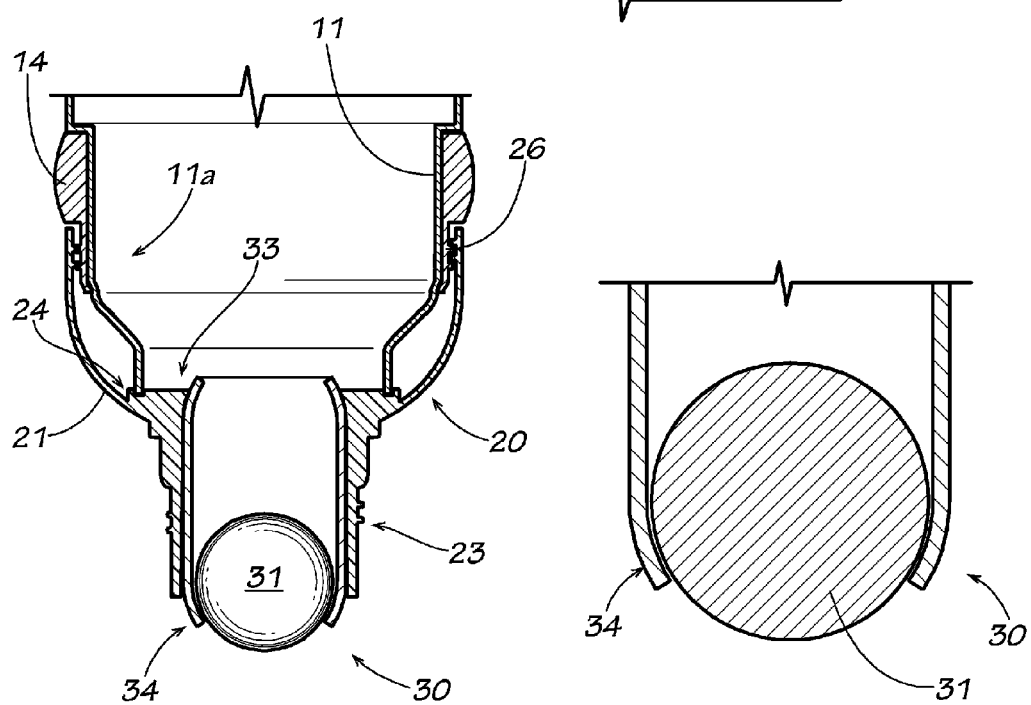
FIG. 6  FIG. 7

PET WATER BOTTLE

CROSS-REFERENCE TO RELATED APPLICATION

This application claims the priority benefit of U.S. Provisional Patent Application Ser. No. 61/187,030, filed Jun. 15, 2009, and U.S. Provisional Patent Application Ser. No. 61/261,947, filed Nov. 17, 2009, which both are hereby incorporated herein by reference.

FIELD OF THE INVENTION

The present invention relates generally to pet products and in particular to a reusable, refillable pet water bottle.

SUMMARY OF THE INVENTION

Briefly described, in a preferred form the present invention comprises a portable water bottle for pets. Preferably the pet water bottle comprises a canister for containing water and having a closed end and an open end. A dispenser is provided near the open end of the canister and having a pet-operable drink valve. Preferably, a removable screw cap is provided for selectively covering and uncovering the pet-operable drink valve. Preferably, the canister is stainless steel.

Preferably, the pet-operable drink valve comprises a spring-less stainless ball valve. Also preferably, the dispenser is removably secured to the canister, as by threads near the open end of the canister, to allow for rapid filling and rinsing of the canister. In one form, the removable dispenser can include threads to engage a threaded plastic collar fitted to the canister.

Optionally, a tether secures the removable screw cap to the dispenser or to the canister generally. Also optionally, slip rings can be attached to the removable screw cap and to the dispenser, each of the slip rings having an opening formed therein for receiving the tether therethrough. The dispenser can comprises a molded plastic body surrounding the stainless steel ball valve.

Defined another way, the present invention comprises water bottle for pets and includes a canister for containing water and having a closed end and an open end, a dispenser adjacent the open end of the canister and having a pet-operable drink valve comprising a spring-less ball valve, and a removable screw cap for selectively covering and uncovering the pet-operable drink valve.

Optionally, the pet water bottle can include a threaded plastic collar fitted to the canister and the dispenser can be threaded to the plastic collar. Also, the pet the dispenser can comprise a molded plastic body surrounding the stainless steel ball valve.

Optionally, the canister can comprise stainless steel, aluminum, or plastic.

The canister or bottle is easily filled with liquid and/or ice cubes and carried by the pet's owner for hydrating the pet while outdoors. When inverted, the pet laps at the stainless steel roller ball in the (inverted) top for easy release of liquid.

BRIEF DESCRIPTION OF THE DRAWINGS

FIG. 1 is a perspective view of a pet water bottle according to a first preferred form of the invention.

FIG. 2 is a front elevation view of the pet water bottle of FIG. 1.

FIG. 5 is a front elevation view of a portion of the pet water bottle of FIG. 1, with a cap portion thereof removed.

FIG. 6 is a close-up, sectional view of a portion of the pet water bottle of FIG. 5.

FIG. 7 is a close-up, sectional view of a valve portion of the pet water bottle of FIG. 6.

DETAILED DESCRIPTION

Figure 3:
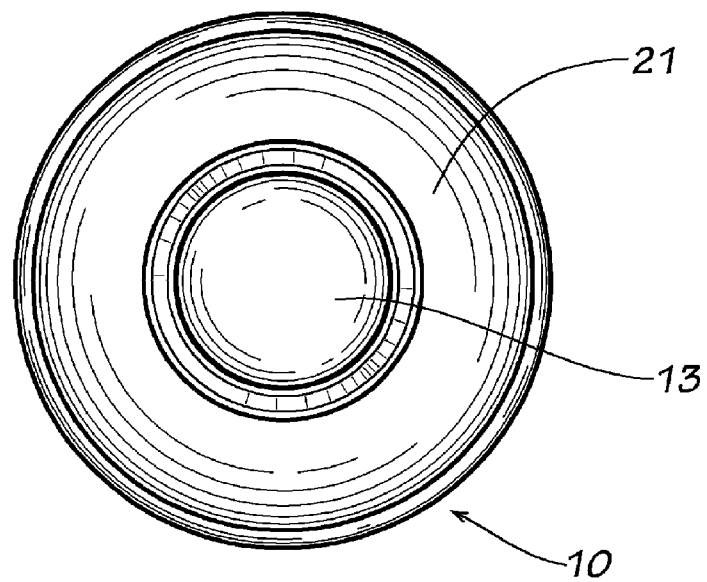
FIG. 3 is a plan view of the pet water bottle of FIG. 1.
Figure 4:
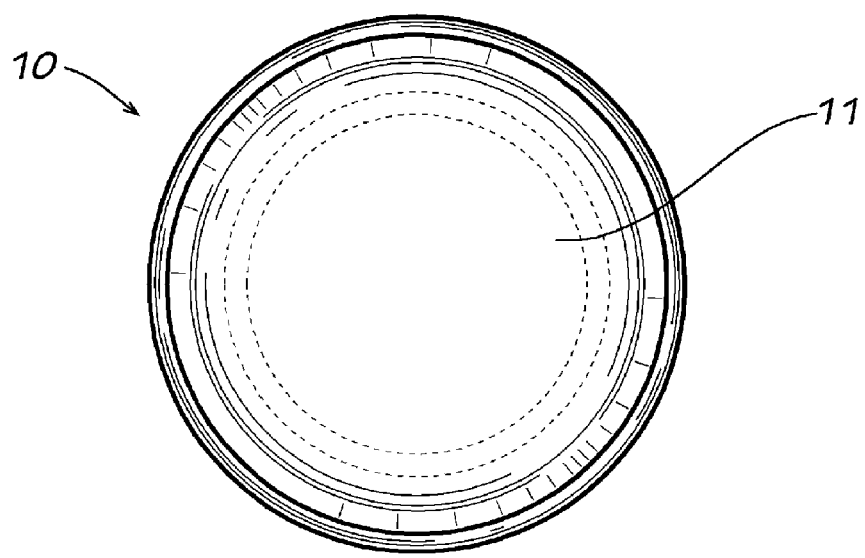
FIG. 4 is a bottom view of the pet water bottle of FIG. 1.

Drawings are included to help in identifying the components of this invention. These paragraphs will describe the components and their functions in which like reference numerals represent like parts throughout the several views.

As seen in FIGS. 1-7, a water bottle 10 for pets according to an example embodiment is shown. The pet water bottle 10 comprises a canister 11, a removable dispenser 20, and a removable screw cap 13. The water bottle 10 shown is designed to hold 24 ounces of liquid; however, the water bottle can be designed/dimensioned to hold more or less liquid as desired. The specific example embodiment depicted herein has a pleasing shape and dimensions, but those skilled in the art will readily appreciate that other sizes and shapes can be provided, as desired.

The canister 11 in this example embodiment is a hollow cylinder made from food-grade stainless steel that has a diameter of approximately 68.50 mm. Other sizes of the canister 11 can be constructed, as desired. The canister 11 can be made from aluminum, plastic, or any other suitable material. The canister 11 has an open end 11*a* and a closed end 11*b*. The open end 11*a* of the canister 11 has a plastic collar 14 securely affixed thereto. The plastic collar 14 includes external male threads and is attached to the open end of the canister 11. The plastic collar 14 can be affixed to the canister 11 by any of several means, such as by an interference fit, as by being molded thereon, adhesive, etc. In this embodiment, the collar 14 is molded separately and fitted tightly about the canister 11, using one or more groove/ridge locking features to help ensure that the collar stays securely attached. Those skilled in the art will recognize that other ways of securing the collar to the canister can be employed. Moreover, if desired the collar 14 can be provided as a removable item, allowing it to be removed from the canister 11 by the user. The plastic collar 14 preferably is made from polypropylene by injection molding and is designed to resist wear and fatigue from continuous use.

The removable screw cap 13 is preferably made from polypropylene via injection molding and is designed to resist fatigue and wear from continuous use when removing and replacing the screw cap 13. The screw cap can also be made from stainless steel, aluminum, or any other suitable material. The screw cap 13 has a silicon gasket recessed therein to seal against the end rim/lip of the dispenser.

The removable dispenser 20 comprises a generally dome-shaped hollow body 21 that is removably screwed to the collar 14. The dispenser 20 receives the removable screw cap 13, removably threaded to the dome-shaped hollow body 21 at screw threads 23 (see FIGS. 5, 6). A silicon gasket is provided at the point where the top of the opening of the stainless steel canister 11 contacts the dome-shaped hollow body 21, generally at 24. The silicone gasket is held in place in an annular recess formed in the underside of the dome-shaped hollow body 21.

The dome-shaped hollow body 21 further comprises a pet-operable water valve 30 including a stainless steel valve ball 31 captured within a stainless steel tube 32. The upper and lower ends 33, 34 of the stainless steel tube 32 are swaged over slightly to prevent the valve ball 31 from completely exiting the tube, while still allowing a portion of the valve ball to extend past the ends of the tube. The tube 32 is recessed within the top portion of the dome-shaped hollow body 21. The tube 32 in this embodiment is made from polished stainless steel, but it can also be made from aluminum, plastic, or any other suitable material. In this example embodiment, the outer diameter of the tube 32 is 16 mm; however, the tube 32 can have a different outer diameter in other embodiments.

The roller or ball 31 is located within the tube 32 for movement therewithin. The tube 32 has radially inwardly extending lips/rims swaged on both ends that prevent the roller ball 31 from slipping out of the tube 32. The swaged rim at the distal end of the tube 32 forms a seal or seat against which the ball 31 forms a generally water-tight seal with the bottle 10 inverted and the ball being pulled downwardly by the force of gravity. The roller or ball 31 preferably is made from polished stainless steel and is sized to be slightly smaller than the inner diameter of the tube 32 for unrestricted movement within and along the tube 32. The ball or roller can also comprise a glass or plastic marble or similar. The tube 32 and the ball 31 function as a pet-operable spring-less stainless steel ball valve. The top portion of the dispenser is a molded plastic body that surrounds and supports the stainless steel ball valve.

The dome-shaped hollow body 21 is generally dome shaped with a top portion extending therefrom and has threads 26 along an inner surface for engaging with the threads on the plastic collar 14 near the open end 11a of the canister 11. The interior silicon gasket recessed within the dome-shaped hollow body 21 seals against the stainless steel rim when the dome-shaped hollow body 21 is attached to the canister 11. This prevents leakage and/or spills.

During normal use of the water bottle, the canister 11 is initially filled with a liquid (e.g. water). When the user wants to provide water to his/her pet, the removable cap 13 is removed from the dispenser 20. The water bottle 10 is then inverted, preferably at a slight shallow angle, and the pet can lick or lap the pet-operable valve 30. As the pet licks or laps at the ball 31, the ball is lifted or slightly moved, temporarily disrupting the water-tight seal between the tube 32 and the ball 31. This temporary disruption of the seal allows a little bit of water to escape and fall through the valve, thereby dispensing a small, controlled amount of liquid to the pet's tongue/mouth. Thus, the pet controls how much water is dispensed, with little wasted water. The user can then re-cover the dispenser 21 with the removable screw cap 13 once the pet is finished drinking.

Figure 8:
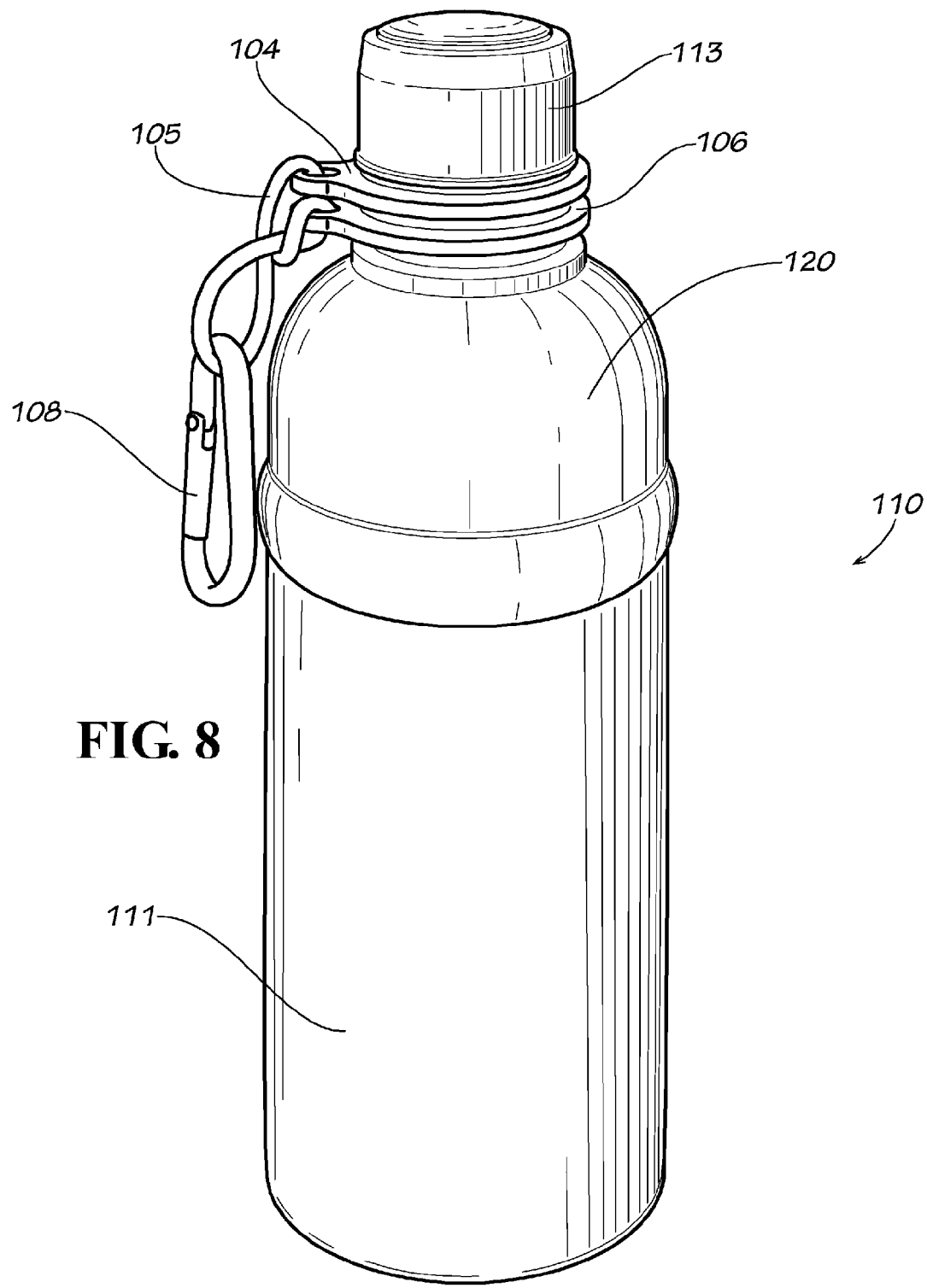
FIG. 8 is a perspective view of a pet water bottle according to another preferred form of the invention and including a lanyard for retaining a screw cap portion of the pet water bottle.

As shown in FIG. 8, optionally the pet water bottle can be provided with a tether for securing the screw cap to the bottle and a hook or loop for securing the bottle to a backpack, belt, belt loop or similar. As shown in this figure, the water bottle 110 includes a canister 111, a removable dispenser 120, and a removable screw cap 113. The removable screw cap 113 also has a tether ring 104 fitted thereon, the ring 104 having an opening formed therein for receiving the tether/woven cord 105 therethrough. Likewise, the removable dispenser 120 is fitted with a similar tether ring 106. Therefore, the tether/woven cord 105 tethers the removable screw cap 113 to the removable dispenser 120, preventing loss of the removable screw cap 113 during use. The tether/woven cord 105 can optionally include a hook or clasp 108 attached thereto for attaching the water bottle to a belt loop, backpack, belt or any other type of attachable structure.

Preferably, a specialized manufacturing process can be used to make the water bottle for pets, although those skilled in the art will recognize that various manufacturing technologies/techniques can be employed. For example, the canister 11 preferably is initially cut from a food-grade stainless steel pipe. The canister 11 is formed to have a closed end and an open end with the stainless steel rim formed thereon. An electrolysis process is then used to polish the canister 11. The plastic collar 14 is then secured to the open end of the canister 11.

The dispenser is formed by initially having the dome-shaped hollow body 21 formed of polypropylene via injection molding. The silicon gasket is then securely attached therein and an optional tether ring 104 is added to the top portion of the dome-shaped hollow body 21, as desired. The tube 32 is cut from a stainless steel pipe and polished. The roller ball 31 is placed within the tube 7 and the end rims/lips are formed on the tube 32 by a swaging or rolling process, effectively capturing the roller ball 31 within the tube 32 and forming the pet-operable valve 30. The pet-operable is valve 30 then secured within the dome-shaped hollow body 21.

It is to be understood that this invention is not limited to the specific devices, methods, conditions, or parameters described and/or shown herein, and that the terminology used herein is for the purpose of describing particular embodiments by way of example only. Thus, the terminology is intended to be broadly construed and is not intended to be limiting of the claimed invention. For example, as used in the specification including the appended claims, the singular forms "a," "an," and "one" include the plural, the term "or" means "and/or," and reference to a particular numerical value includes at least that particular value, unless the context clearly dictates otherwise. In addition, any methods described herein are not intended to be limited to the sequence of steps described but can be carried out in other sequences, unless expressly stated otherwise herein.

While the invention has been shown and described in exemplary forms, it will be apparent to those skilled in the art that many modifications, additions, and deletions can be made therein without departing from the spirit and scope of the invention as defined by the following claims.

What is claimed is:

1. A water bottle for pets, comprising:
   a stainless steel canister for containing water and having a closed end and an open end;
   threads positioned near the open end of the canister;
   a removable dispenser having threads for engaging the threads near the open end of the canister and having a pet-operable drink valve;
   a removable screw cap for selectively covering and uncovering the pet-operable drink valve;
   a tether securing the removable screw cap to the dispenser; and
   slip rings attached to the removable screw cap and to the dispenser, each of the slip rings having an opening formed therein for receiving the tether therethrough.

2. The pet water bottle as claimed in claim 1 wherein the pet-operable drink valve comprises a spring-less stainless ball valve.

3. The pet water bottle as claimed in claim 2 wherein the dispenser comprises a molded plastic body surrounding the stainless steel ball valve.

4. The pet water bottle as claimed in claim 1 wherein the threads near the open end of the canister comprise a threaded plastic collar fitted to the canister.

5. The pet water bottle as claimed in claim 4 wherein the removable dispenser has threads for engaging the threaded plastic collar fitted to the canister.

6. A water bottle for pets, comprising:

a stainless steel canister for containing water and having a closed end and an open end;

a dispenser adjacent the open end of the canister and having a pet-operable drink valve comprising a spring-less ball valve;

a removable screw cap for selectively covering and uncovering the pet-operable drink valve;

a tether securing the removable screw cap to the dispenser; and slip rings attached to the removable screw cap and to the dispenser, each of the slip rings having an opening formed therein for receiving the tether therethrough.

7. The pet water bottle as claimed in claim 6 further comprising a threaded plastic collar fitted to the canister and wherein the dispenser is threaded to the plastic collar.

8. The pet water bottle as claimed in claim 7 wherein the dispenser comprises a molded plastic body surrounding the stainless steel ball valve.

* * * * *